United States Patent
Miller et al.

(10) Patent No.: US 6,385,220 B1
(45) Date of Patent: May 7, 2002

(54) LASER CLAMPING ASSEMBLY AND METHOD

(75) Inventors: Robert John Dwayne Miller, Port Credit; Yan Liao; Michael Robert Armstrong, both of Toronto; David Ronald Walker, Ottawa, all of (CA)

(73) Assignee: GSI Lumonics Inc., Kanata (CA)

( * ) Notice: Subject to any disclaimer, the term of this patent is extended or adjusted under 35 U.S.C. 154(b) by 0 days.

(21) Appl. No.: 09/295,338

(22) Filed: Apr. 21, 1999

(51) Int. Cl.$^7$ .............................. H01S 3/042; H01S 3/06
(52) U.S. Cl. .................................. 372/34; 36/66; 36/67
(58) Field of Search .............................. 372/34, 33, 36, 372/66, 67

(56) References Cited

U.S. PATENT DOCUMENTS

| | | | |
|---|---|---|---|
| 4,942,582 A | 7/1990 | Kintz et al. ................... 372/18 |
| 5,181,214 A | 1/1993 | Berger et al. ................. 372/34 |
| 5,193,096 A | 3/1993 | Amano ......................... 372/13 |
| 5,257,277 A | 10/1993 | Yagi et al. .................... 372/75 |
| 5,311,528 A | 5/1994 | Fujino ......................... 372/35 |
| 5,325,384 A | 6/1994 | Herb et al. ................... 372/36 |
| 5,553,088 A | 9/1996 | Brauch et al. ................ 372/34 |
| 5,557,628 A | 9/1996 | Kuba et al. ................... 372/70 |
| 5,581,569 A | 12/1996 | Tanuma ........................ 372/41 |
| 5,651,022 A | 7/1997 | Anthon et al. ................ 372/92 |
| 5,774,489 A | 6/1998 | Moulton et al. .............. 372/70 |
| 5,781,573 A | 7/1998 | Basu ........................... 372/34 |
| 5,832,016 A | 11/1998 | Basu ........................... 372/34 |
| 6,101,201 A | * 8/2000 | Hargis | |

FOREIGN PATENT DOCUMENTS

| | | |
|---|---|---|
| DE | 41 32 063 A1 | 4/1993 |
| EP | 0 567 287 A1 | 10/1993 |
| EP | 0 847 114 A1 | 6/1998 |
| JP | 09055551 | 2/1997 |
| WO | WO 98/32197 | 7/1998 |

OTHER PUBLICATIONS

Yan Liao et al. "Pressure tuning of thermal lensing for high–power scaling", *Optics Letters*, Oct. 1, 1999, vol. 24, No. 19,. pp.1343–1345.

(List continued on next page.)

*Primary Examiner*—James W. Davie

(57) ABSTRACT

A laser clamping system for a disc laser medium that includes two heat conductive members (one of which is optically transparent) positioned on either side of a disc laser. Pressure is applied to the conductive members to restrain the disc from deforming under pumping conditions to reduce the lensing effect. Thin disc geometry allows the thermal load of laser material to be much closer to the heat conductive members so that heat dissipation is generally more efficient than that of other geometric configurations (e.g. rod or slab). In disc lasers each part of the laser beam experiences the same temperature gradient so that there is no lensing effect caused by radial temperature distribution. It has been discovered that any resulting lensing effect is disc lasers is mainly from the thermo-mechanical deformation of the disc itself. Consequently, a disc laser with clamped boundary conditions using the system as described above reduces the lensing effect and enables scaling laser power to a much higher level compared to unclamped disc laser systems. The clamping system and method of the present invention also improves performance in rod and slab type laser medium geometries.

58 Claims, 11 Drawing Sheets

OTHER PUBLICATIONS

Voss, A; et al., "Efficient High–Power Diode–Pumped Thin–disc Yb:YAG Laser", *Proc. of the 9th Meeting on Optical Engineering in Israel*, Tel Aviv, 1994. Bellingham (WA): SPIE, 1995, S. 501 (SPIE Proc. vol. 2426). (No month).

Contag, Karsten; et al., "Multi–Hundred Watt Diode Pumped Yb:YAG Thin Disc Laser", *Proceedings of the Spie Solid–State Lasers VI*, R. Scheps (ed.), 2986, 2–9 (1997). (No month).

Pfistner, C.; et al., "Thermal Beam Distortions in End–Pumped Nd:YAG, Nd:GSGG, and Nd:YLF Rods", *IEEE Journal of Quantum Electronics*, vol. 30, No. 7, Jul. 1994, pp. 1605–1615.

Karszewski, M.; et al., "100 W $Tem_{00}$ Operation of Yb:YAG Thin Disc Laser With High Efficiency", *OSA Tops vol. 19 Advanced Solid State Lasers*, 1998, pp. 296–299. (No month).

Hollemann, G.; et al., "Efficient Nearly Diffraction–Limited Thin–Disk Lasers", Apr. 1997.

* cited by examiner

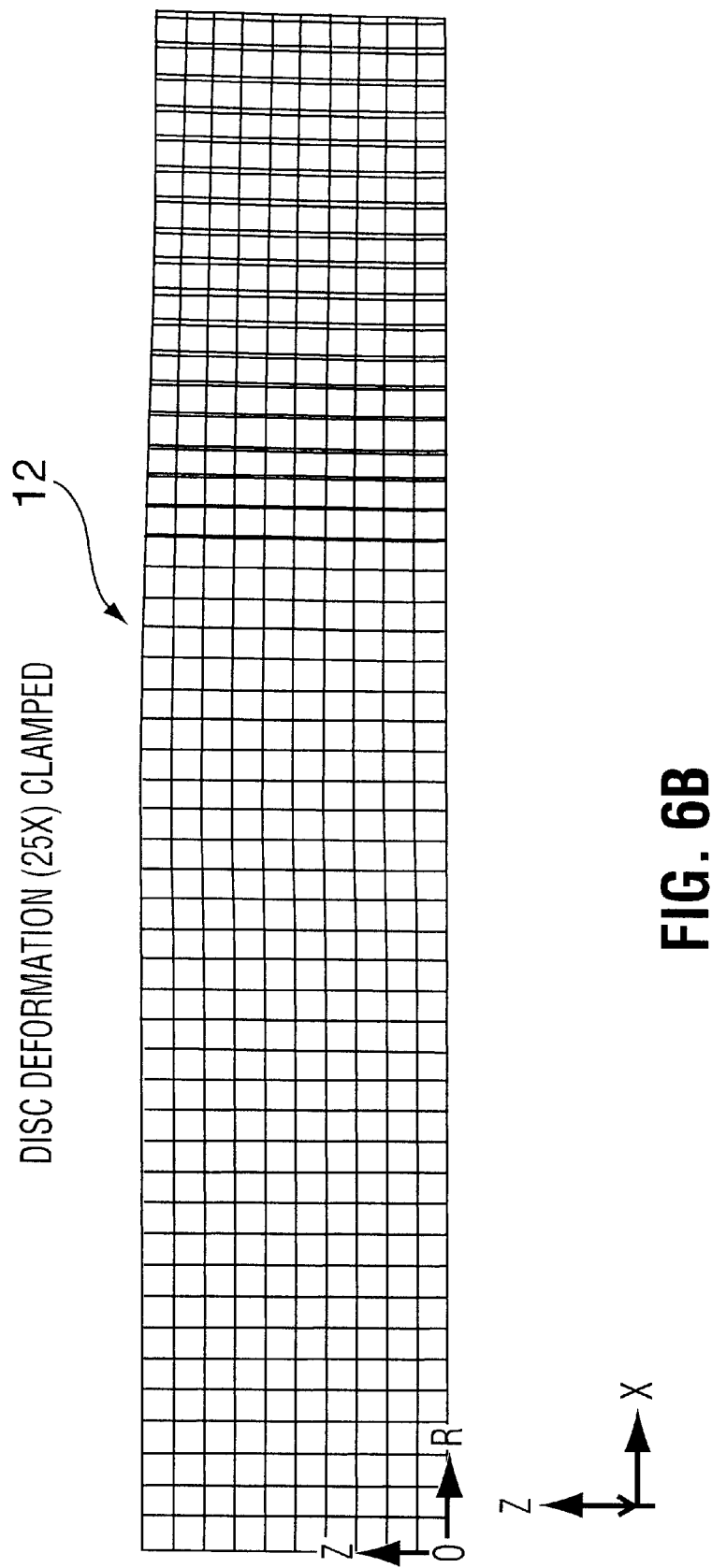

LASER CLAMPING ASSEMBLY AND METHOD

FIELD OF THE INVENTION

This invention relates to the field of solid state lasers and more particularly to a clamping arrangement and method for a solid state laser media that mitigates thermal focusing and depolarization of laser radiation stimulated within the medium of the solid state laser.

BACKGROUND OF THE INVENTION

In general, the problem with laser systems is to achieve power that is as high as possible, and also to maintain stable laser performance over a broad power range (i.e. from low to high power). Laser power dependent thermal lensing or temperature induced changes in the index of refraction of the laser material that cause distortion of the laser beam as it passes through the laser material have been a major impediment to achieving stable laser operation over a broad power range. Typically, solid state lasers are designed to operate at a single operating power so that constant pumping power and constant temperatures are maintained thereby stabilizing thermally-induced effects to the laser material. However, many current lasing applications require that a user controlled variable output power feature be available in order to enhance the functionality of the laser.

Disc or thin plate lasers have been proposed in the prior art to at least partially deal with this problem (See for example U.S. Pat. No. 5,553,088 issued Sept. 3, 1996, hereby incorporated by reference).

The advantage of disc or thin plate laser systems is that the solid body can be pumped at a high pumping power since the heat resulting thereby can be transferred to a solid cooling element via a cooling surface at one or both ends.

The temperature gradient formed in the solid body does not lead to a negative effect on the beam quality of the laser radiation field at high pumping power since the laser radiation field propagates approximately parallel to the temperature gradient in the solid body so the laser radiation field "sees" the same temperature gradient in all the cross-sectional areas. In summary, the use of an end-cooled disc or thin plate laser material geometry can in principle result in reduced thermal lens distortion.

However, in practice, non-amplified solid state laser assemblies (including disc, slab, and rod type laser mediums) continue to be hampered by thermal effects when pumped at broad power ranges (i.e. from low to high power).

SUMMARY OF THE INVENTION

An object of the present invention is to provide a laser clamping assembly and method for a laser material within a solid state laser that has reduced thermo-mechanical distortion of the laser material and consequently reduced distortion of an output laser beam.

Another object of the present invention is to provide a laser clamping assembly and method for a laser material within a solid state laser that generates a high quality diffraction-limited beam.

Another object of the present invention is to provide a laser clamp assembly and method for a laser material within a solid state laser that has reduced optical and polarization distortion.

Another object of the present invention is to provide a laser clamping assembly and method for a laser material within a solid state laser that is less susceptible to material fractures and mechanical distortion due to stress from large thermal gradients caused by increased pumping power.

Another object of the present invention is to provide a laser clamping assembly and method for a laser material within a solid state laser that reduces the effects of pumped-induced heating of the laser material on the properties of the laser output beam.

In accordance with one aspect of the present invention there is provided a laser clamping system for a laser medium in a solid state laser comprising: (a) a first member made from a heat conductive material; (b) a second member constructed to allow a laser beam to pass therethrough substantially unattenuated, the laser medium being disposed between and in contact with the first and second member; and (c) means for applying pressure to the laser medium through the first and second members to inhibit thermo-deformation of the laser medium.

In accordance with another aspect of the present invention there is provided a laser clamping system for a laser medium in a solid state laser comprising: (a) two heat conducting members, each heat conducting member having a generally planar surface, the two heat conducting members being oriented to receive the laser medium such that the laser medium contacts the generally planar surfaces of the two heat conducting members; (b) at least one of the heat conducting members allows the laser beam to pass therethrough substantially unattenuated and unchanged; and (c) pressure means for holding both heat conducting members in contact against the laser medium, whereby the heat conducting members and the pressure means remove heat from the laser medium under pumping conditions.

In accordance with another aspect of the present invention there is provided a thin-plate laser comprising: (a) a solid state laser medium configured as a thin-plate; (b) two heat conductive members capturing the solid state laser medium therebetween, the two heat conductive members each generally conforming to one of a pair of opposed surfaces of the solid state laser medium to facilitate heat transfer from the solid state laser medium to the two heat conductive members; (c) at least one of the heat conductive members being optically transparent to transmit pumping light from a source to the solid state laser medium; and (d) force applying means for applying pressure to the heat conductive members to restrain the solid state laser medium from mechanical deformation under pumping conditions.

In accordance with another aspect of the present invention there is provided a method for enhancing an output of a laser having a solid state laser medium, the method comprising the steps of: (a) pumping the solid state laser medium through at least one of two heat conductive members, one heat conductive member being disposed in thermal contact with each of two generally opposed surfaces of the solid state laser medium; (b) removing heat from the solid state laser medium via the two heat conductive members; and (c) applying pressure to the heat conductive members to restrain the solid state laser medium from mechanically deforming under pumping conditions to mitigate thermal focusing and depolarization of laser radiation stimulated with the solid state laser medium.

BRIEF DESCRIPTION OF THE DRAWINGS

The present invention will be described in conjunction with the drawings in which:

FIGS. 6A and 6B show schematic representations of disc laser medium deformation under un-clamped and clamped conditions, respectively, where the FIG. 6B schematic is illustrated at a higher magnification to illustrate that the clamped disc laser medium is significantly less deformed than the un-clamped disc;

DETAILED DESCRIPTION OF EMBODIMENTS OF THE INVENTION

In contrast to the lensing effect caused by a radial temperature distribution in laser materials as discussed above, it has been discovered that thermo-mechanical deformation of laser material can also contribute to the lensing effect to reduce the maximum output power and to limit the output power range of stable operation of a solid state laser. In particular, a laser consisting of an unclamped thin disc or plate is prone to thermally-induced mechanical distortion due to the compliant nature of the disc geometry. The distortion reduces maximum output power and limits the stable operating range of the laser as discussed previously.

Figure 1:
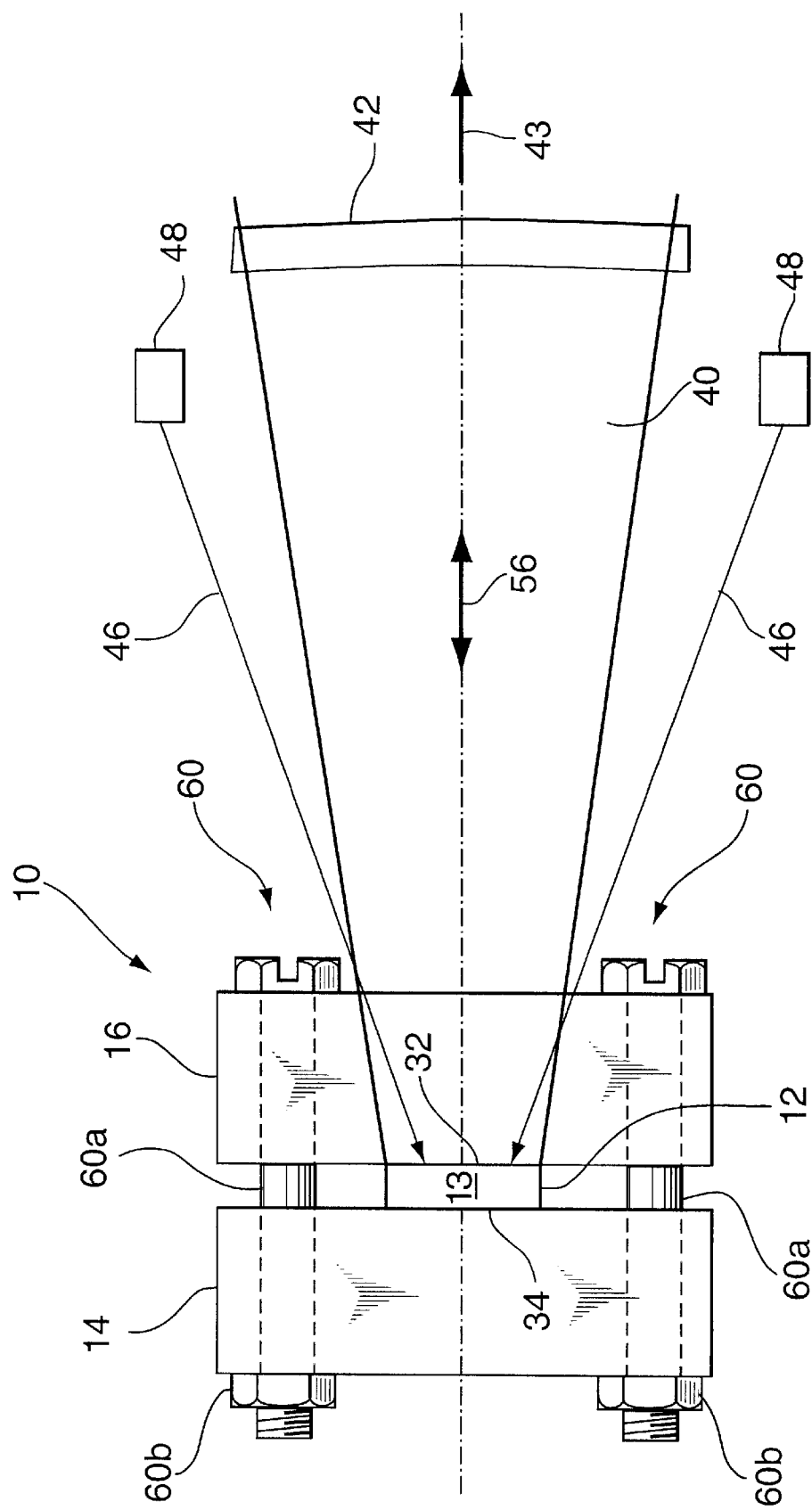
FIG. 1 shows a first embodiment of an inventive solid state laser clamping assembly for a disc type laser medium geometry.

A laser clamping assembly 10 according to an embodiment of the present invention is illustrated in FIG. 1 to mitigate thermo-mechanical deformation of a disc laser.

The disc laser assembly 10 includes a solid state disc laser 12 having a crystal lasing material 13 made of a neodymium-doped material (for example) that when irradiated or pumped produces lasing action as discussed in more detail below. Disposed on both sides of the disc 12 to capture the disc 12 therebetween are a heat sink body 14 made of suitable heat conductive material(s) and a pressure applying body 16 made from a suitable optically transparent material, such as fused silica, sapphire or diamond. The pressure body 16 is also preferably made of a heat conductive material to further enhance the cooling effect of the disc 12 as discussed in more detail below.

A heat/thermal conductive material includes metals such as copper, brass, aluminum, and nickel; other materials such as diamond and silicon carbide; and gold or nickel-coated versions of these substrates.

Figure 2A:
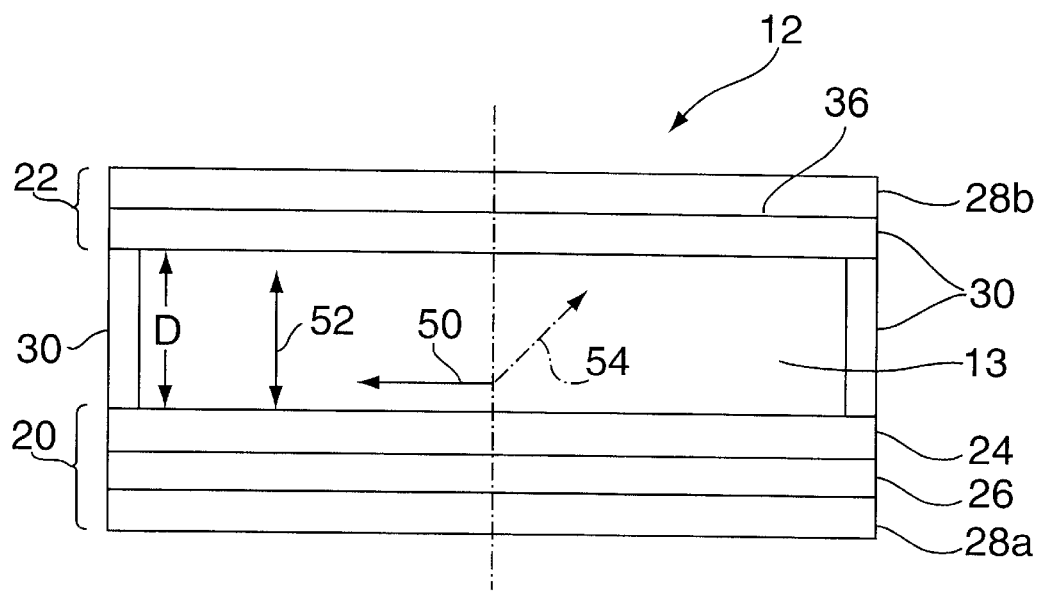
FIG. 2A shows an exaggerated cross section of the disc laser shown in FIG. 1 according to an embodiment of the present invention.

An exaggerated cross-section of the disc 12 having a heat sink side 20 and a pressure side 22 is shown in FIG. 2A according to an embodiment of the present invention. The heat sink side 20 of the disc 12 includes a reflector layer 24, a metal layer 26 and a contact layer 28a. The pressure side 22 of the disc 12 includes an anti-reflective coating 30 and a contact layer 28b. The contact layer 28b can be any material that is transparent at the pump and laser wavelengths, such as an index matching fluid. Alternatively, the contact layer 28b can be omitted if, for example, the disc 12 is optically contacted with the pressure applying body 16.

The reflector layer 24 is preferably a high reflectivity coating material at both the laser and pump wavelengths. The metal layer 26, preferably of gold or copper, is used to maintain good thermal contact between the crystal 13 (via the reflector layer 24) and the contact layer 28a. The metal layer 26 is in contact with the heat sink 14 (via the contact layer 28a). The contact layer 28a is made of a soft metal, such as soft solder or indium. The contact layer 28b on the pressure side 22 of the disc 12, layered over the anti-reflective coating 30, functions in the same manner.

In order to facilitate good thermal contact of the heat sink 14 and the pressure body 16 with the disc 12, inboard surfaces 32 and 34 of the pressure body 16 and heat sink 14, respectively, are machined flat, and preferably polished, to be generally complimentary to the corresponding surfaces of the disc 12. This arrangement mitigates the occurrence of voids or air gaps between the bodies 14 and 16 and the disc 12. The contact layers 28a,b also contribute in filling any voids therebetween, thereby enhancing heat conductivity between the disc 12 and the bodies 12 and 14 even further.

Figure 2B:
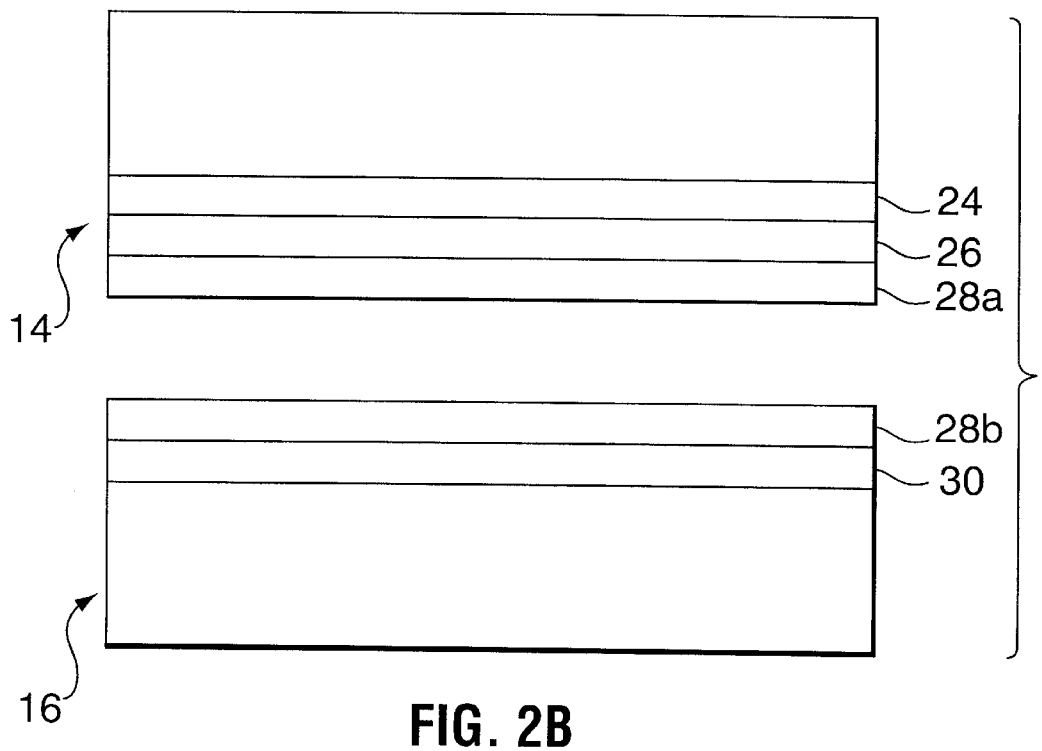
FIG. 2B shows a cross section of the heat sink and the pressure body shown in FIG. 1 according to another embodiment of the present invention.

The reflective layer 24, the metal layer 26 and the contact layer 28a for the heat sink side 20 can also be layered directly on the heat sink 14 as shown in FIG. 2B to provide the same overall assembly 10 as with the disc 12 shown in FIG. 2A. Further, the contact layer 28b of the pressure side 22 can be layered directly on the pressure body 16 as shown in FIG. 2B to provide the same overall assembly 10 as with the disc 12 shown in FIG. 2A.

The disc 12 is a circular disc that includes, at least in a surface direction 50, a dimension that is greater, preferably several times greater, than a thickness D of the crystal 13, measured in a direction 52 that is at right angles to the surface direction 50. Further, a second surface direction 54, which is at right angles to the surface direction 50, has a dimension that is likewise greater than the thickness D.

The disc 12 bears a pumping surface 36 that is penetrated by a laser radiation field 40. The laser radiation field 40 is formed, on the one hand, between a coupling-out mirror 42, which generates the laser output beam 43, and the reflector layer 24, which together form a resonator 44 to form a laser system.

The laser radiation field 40 of the resonator 44 penetrates the pumping surface 36 of the disc 12, enters the crystal 13 and is reflected by the reflector layer 24 of the disc 12. The pumping surface 36 is also penetrated by pumping light 46 from pumping light radiation source(s) 48. The pumping light 46 leads to an excitation of the crystal laser material 13 in the disc 12, in particular in the region thereof penetrated by the laser radiation field 40.

The heat conductivity of the heat sink 14 is greater than that of the disc 12 so that a more effective heat conduction takes place in the heat sink 14 than in the disc 12. A temperature gradient results in the disc 12 that is parallel to the direction 52 (see FIG. 2A) and extends essentially parallel to a direction of propagation 56 of the laser radiation field 40. In addition, the short path length through the disc 12 reduces the integrated optical path difference (OPD) relative to longer solid state gain media (e.g. standard laser rods) with comparable radial temperature gradients.

Cooling of the disc 12 from one or both ends results in a major temperature gradient in the direction 54 from the surface 34 to the surface 32, which is parallel to the direction of propagation 56 of the laser beam in the laser material 13. This also reduces the temperature gradients perpendicular 50 to the direction of propagation 56 of the laser beam. The temperature gradients in the laser material 13 and the temperature difference between the surfaces 34 and 32 of the disc 12 results in the physical deformation of the disc 12.

This physical deformation, which in its simplest form acts like a thermally-induced lens to focus or defocus the laser beam as pumping power is changed, can be restricted using the pressure body 16 to essentially maintain the shape of the disc 12 to increase the maximum laser output power and to allow optimal stable lasing performance in an operating regime extending over a broad power band.

This is accomplished according to one embodiment, as illustrated in FIG. 1, by bolting the pressure body 16 to the heat sink 14 with a series of bolt assemblies 60 (consisting of sets of bolts 60a and nuts 60b). As the bolts assemblies 60 are tightened the disc 12 is restrained from deforming during high power pumping operation. In order to counteract the expansion forces serving to distort the disc 12, a substantial clamping pressure is required, typically in excess of 50 pounds per square inch for disc/plate type laser geometries.

By essentially maintaining the shape (i.e. flat) of the disc 12, the lensing effect and depolarization of the laser radiation field 40 stimulated in the disc 12 is mitigated to enable the laser output 43 to attain maximum power levels under high pumping conditions, and to operate in a stable fashion over an operating regime extending from low power to a maximum power level attained under high power pumping conditions.

Since the disc 12 is pumped by sources 48 through the pressure body 16, the pressure body 16 is optically transparent (as per embodiment of FIG. 1) and has a high transmission at the laser and pumping wavelengths. The pressure body 16 is preferably made using a material that is harder than the laser material 13 of the disc 12. There are a number of choices of a hard transparent material including fused silica, sapphire and diamond. In assemblies where the pressure body 16 is also to be used a cooling element, the choice of sapphire or diamond that have relatively higher thermal conductivity can be used.

Figure 3A:
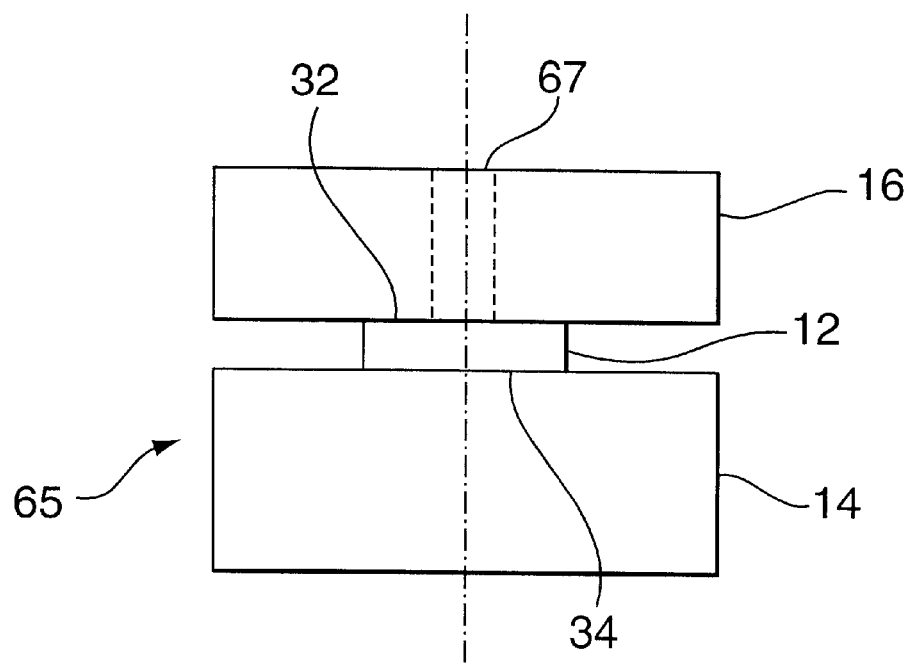
FIG. 3A shows a variation of the first embodiment relating to the pressure body having an aperture for lasing the laser medium.

FIG. 3A illustrates a cross-section of an alternative laser assembly 65 where the pressure body 16 includes a small (relative to the size of the pressure body 16 as a whole) aperture 67 to allow the laser and pumping light to pass therethrough to obviate the necessity that the material of the pressure body 16 be transparent. The pressure body 16 can still apply sufficient force on the disc 12 throughout a majority of its surface to inhibit mechanical deformation according to the present invention. In this case, a wider choice of materials is available for the pressure body 16 and the heat conducting function can be enhanced by using good conductors such as metals or coated metals such as cooper, aluminum, stainless steel, or gold.

The hardness of the materials of both the heat sink 14 and the pressure body 16 is preferably greater than the hardness of the material of the disc 12 in order to ensure effective confinement of the disc 12 and transfer of the applied forces effectively to the surfaces of the disc 12.

Figure 3B:
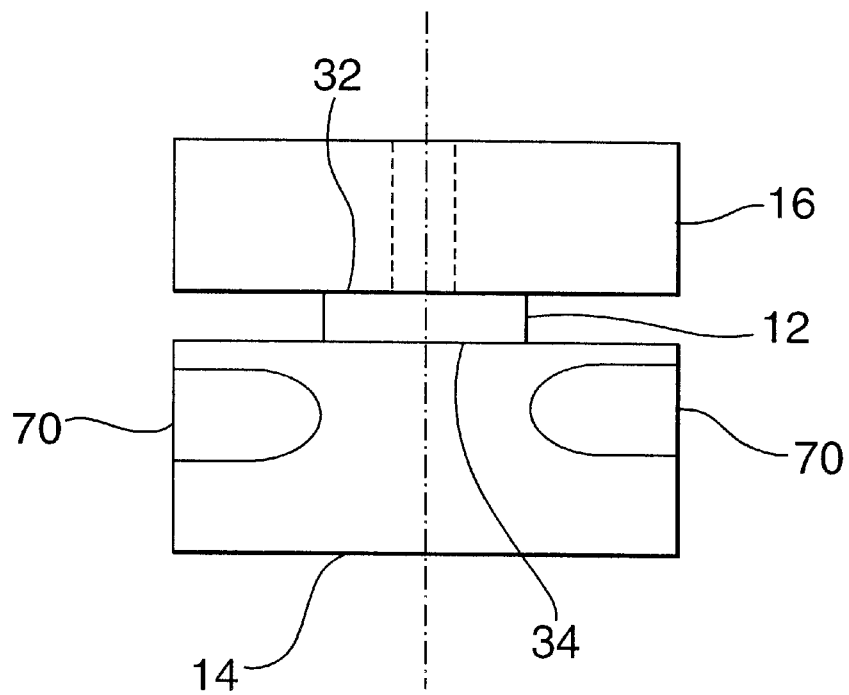
FIG. 3B shows a variation of the first embodiment relating to the cooling of the disc laser through the introduction of a cooling channel in the heat sink of FIG. 1.

To improve the cooling capabilities of the heat sink 14 a cooling channel 70 is included in the heat sink 14 as shown in the alternative embodiment of FIG. 3B. The cooling channel 70 is located around the area where the disc 12 is located and is close to the inboard surface 34 of the heat sink 14. The cooling channel 70 is penetrated by a cooling medium, preferably cold water, so that heat is transported out of the material of the disc 12.

Figure 4:
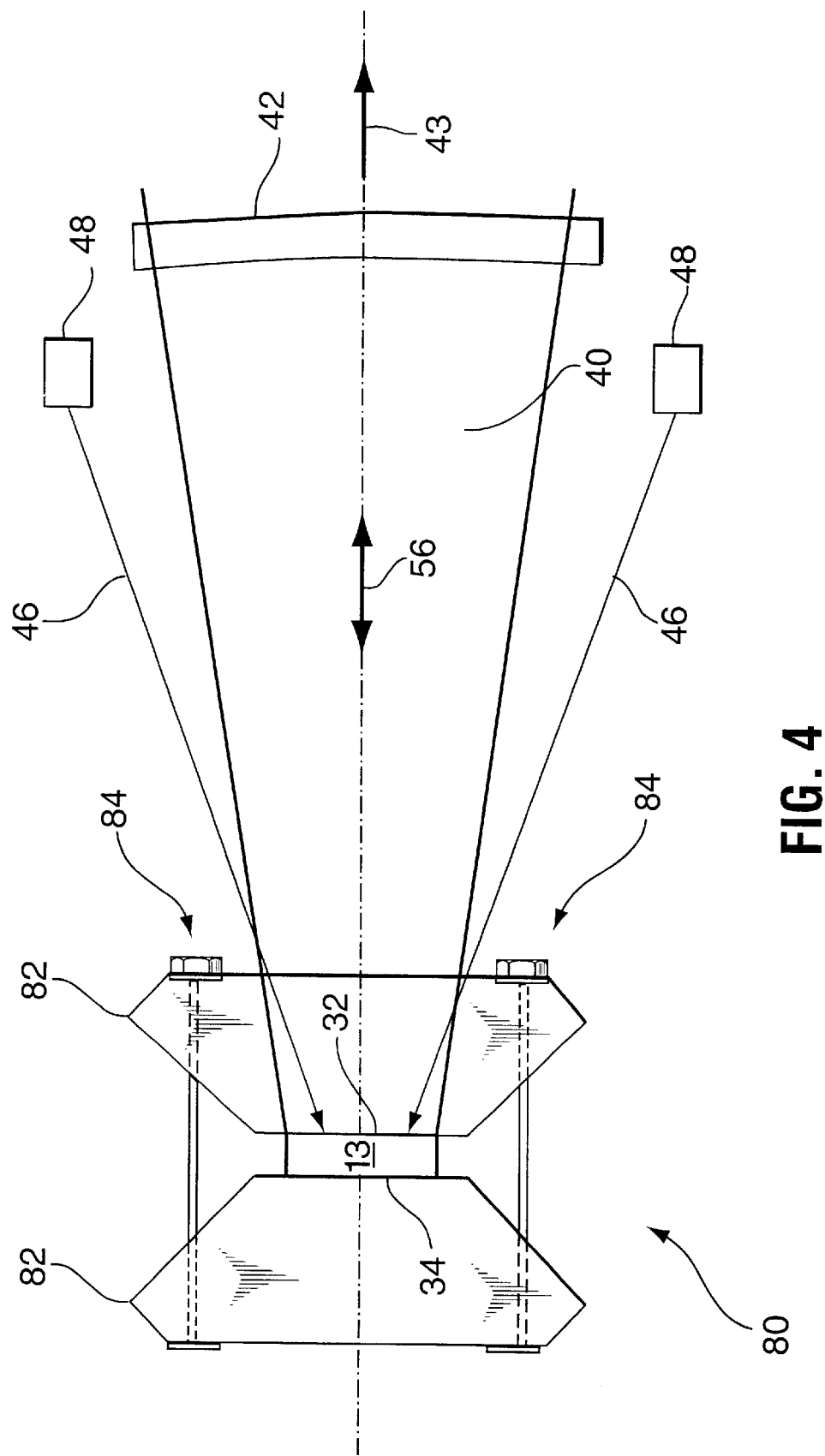
FIG. 4 shows a second embodiment of an inventive disc laser clamping assembly for a disc type laser medium geometry.

FIG. 4 illustrates a diamond anvil clamping assembly 80 according to another embodiment of the present invention. In the assembly 80, the disc 12 is positioned between two diamond anvils 82 (for example AA-type diamonds) that are highly polished at the contact surfaces 32 and 34. AA-type diamond is a material with an extremely high hardness index and good thermal conductivity. The anvils 82 are forced together with a set of pressure applying assemblies 84 to restrain the disc 12 from mechanical deformation during lasing. Since diamond is a transparent material, the pumping sources 48 can be situated on either side of the disc 12 provided that the coatings 24, 26, 28a, 28b, and 30 (if used) are transparent to the light at the pump wavelength.

An advantage of the diamond anvil assembly 80 is that both the heat sink 14 and the pressure body 16 are good thermal conductors thereby providing enhanced cooling of the laser material 14 by virtue of cooling from both ends of the disc 12 with good thermal contact to both cooling surfaces provided by the strong pressure contact. The assembly 80 enables the use of a thicker disc to provide a longer optical gain length and greater structural strength. The use of a transparent heat sink 14 allows the disc 12 to be pumped from the side opposite the laser cavity thereby reducing the complexity of the pumping scheme considerably.

Figure 5A:
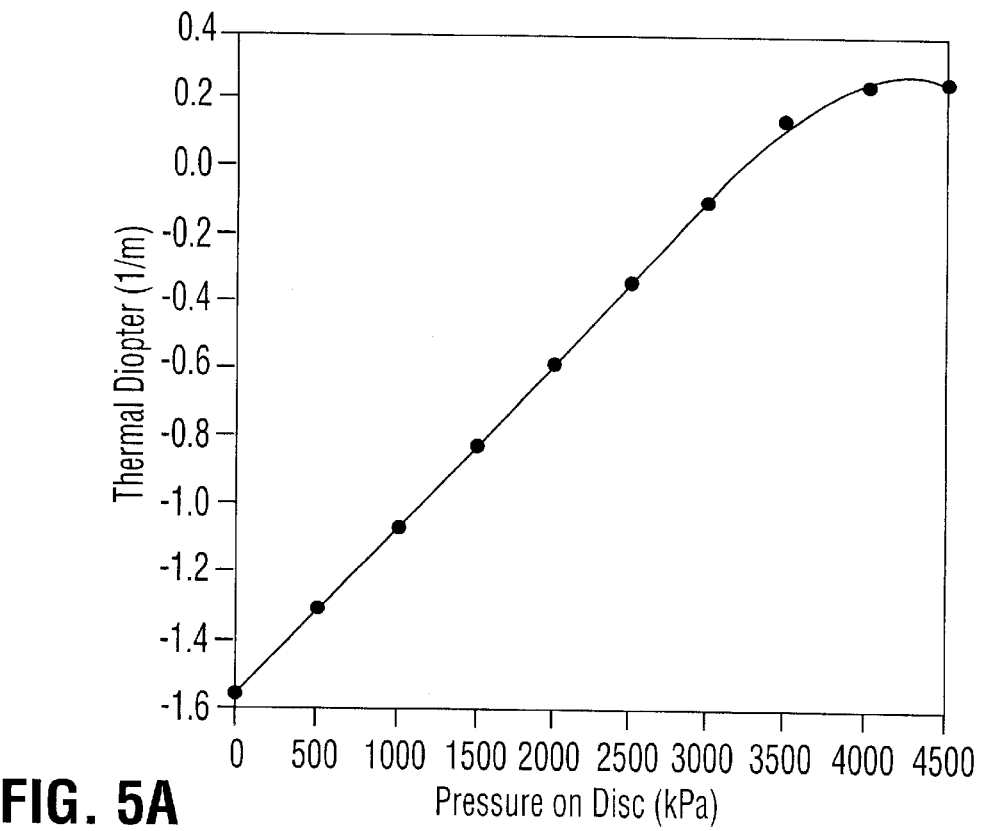
FIG. 5A shows a graph of thermal focussing power (in diopters) of a disc laser medium that has been compressed with between 0 and 4500 kPa of pressure.
Figure 5B:
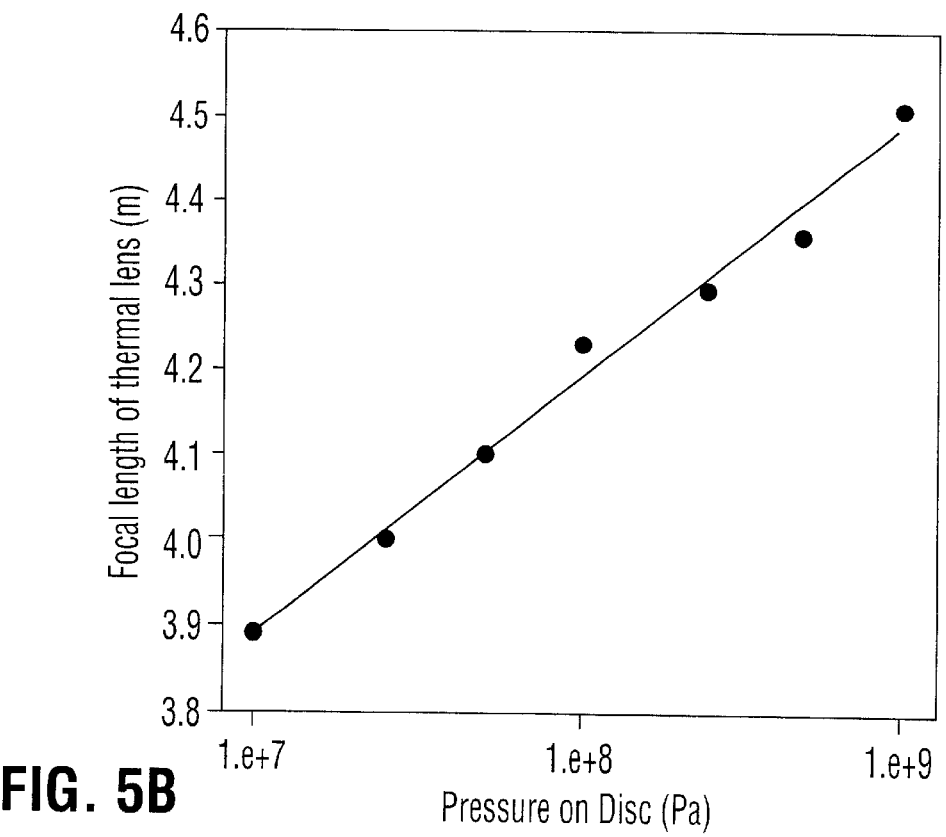
FIG. 5B shows a graph of the measured thermal lens focal length of a disc laser medium that has been compressed with between 10 MPa and 1 GPa of pressure.

FIGS. 5A and 5B illustrate the focal power (in diopters) of the disc 12 versus the clamping pressure in two pressure ranges. Specifically, FIG. 5A is a graph of thermal diopter (1/m) versus pressure on the disc (kPa) taken over a range of pressures from 0–4500 kPa. FIG. 5B is a graph of focal length of thermal lens (m) versus the pressure on the disc (Pa) over a range of 1.e+7 (10 MPa) to 1.e+9 (1 GPa).

Figure 6A:
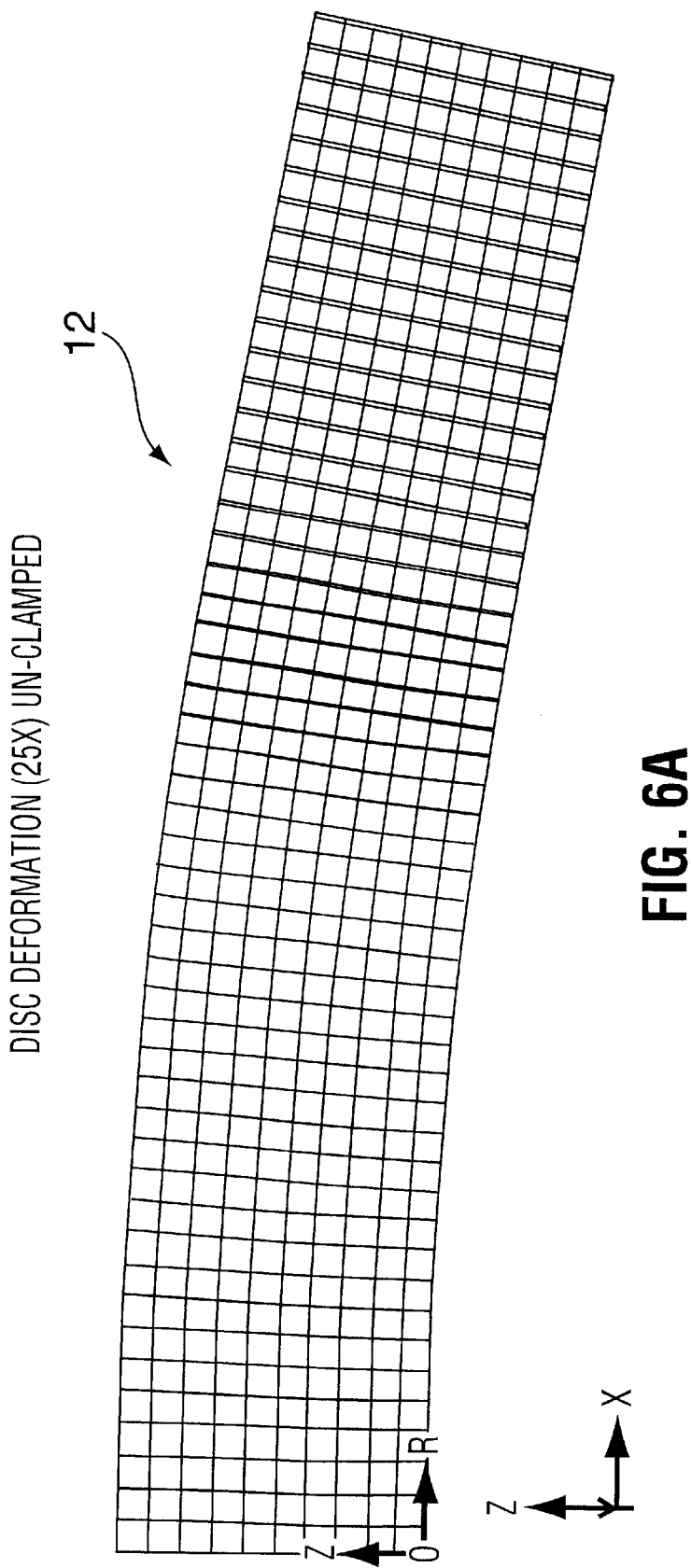

FIGS. 6A and 6B show simulated results (using finite element method modeling techniques well known in the art) for a Nd:YAG disc 12 under 100 watts of constant pump power from a diode laser (such as from sources 48) for an un-clamped and clamped disc laser medium respectively. The size of the crystal 13 of the disc 12 is $\phi 3 \times 0.3$ mm and the pump spot diameter is 2 mm. In this simulation, the heat sink body 14 holds the rear face of the disc 12 at a constant temperature and the pressure body 16 exerts pressure on the face of the disc 12 but does not remove heat from the disc 12.

At low pressures (in the range 0–3 MPa), the disc 'bends' as illustrated in FIG. 6A and the thermal lens that results from this deformation is negative. At intermediate pressures ($\approx 4$ MPa), the disc 12 is pushed against the heat sink 14 and the deformation is nearly eliminated, resulting in a small thermal lens as shown in FIG. 5A. At high pressures (>4 MPa), the bending is suppressed and the thermal lens is positive due to surface bulging (as shown in FIGS. 5B and 6B). At higher pressures, the magnitude of the thermal lens does not significantly decrease since much higher pressures are necessary to compress the crystal 13 enough to eliminate the bulge (see FIG. 5A). FIG. 6A illustrates the deformation of the disc 12 without clamping (zero pressure in FIG. 5A). The thermal lens is negative because of the bending.

Figure 7:
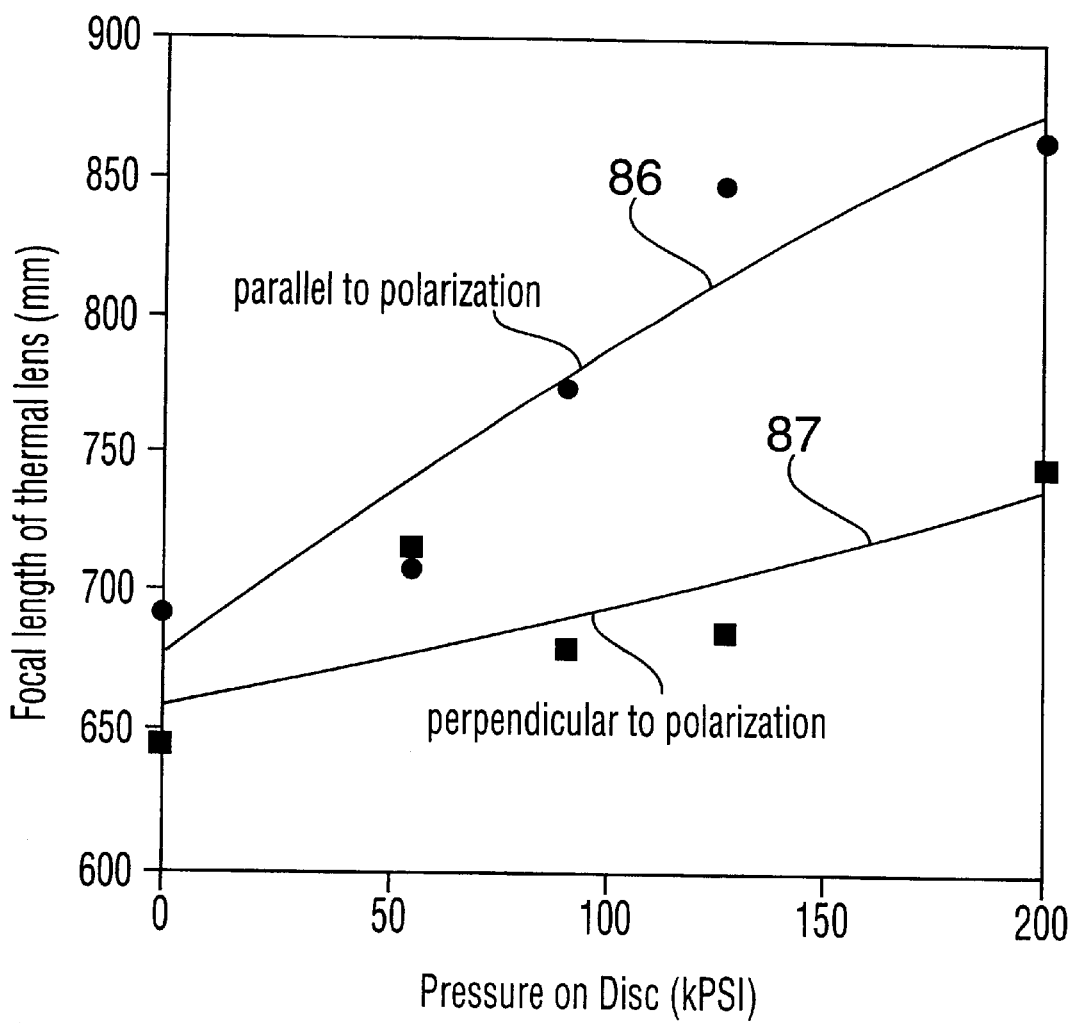
FIG. 7 shows a graph of the measured thermal lens focal length of a 5×5×0.4 mm$^3$ Nd:YVO4 disc laser that is compressed with pressures between 0–200 kPSI measured parallel and perpendicular to the direction of polarization.

FIG. 7 shows the experimental results of thermal focal length (mm) depending on the applied pressures (for 0–200 kPSI) for a 5×5×0.4 mm Nd:YVO$_4$ disc. The absorbed pump power was 26 watts and the pump spot is about 1 mm. The graph of FIG. 7 shows two plots-a first plot 86 measured parallel (e.g. direction 54 in FIG. 2A) to the direction of polarization, and a second plot 87 measured perpendicular (e.g. direction 50 in FIG. 2A) to the direction of polarization.

Both computer simulation and experimental results show that the thermal lens is improved proportionally with the increase of the applied pressure. Also, the tangential (hoop) stress that leads to fracture of the laser material 13 at high pumping power is mitigated. This permits significant gains in maximum output power as well as an increase in the stable operating range of the laser from low power to high power.

Figure 8A:
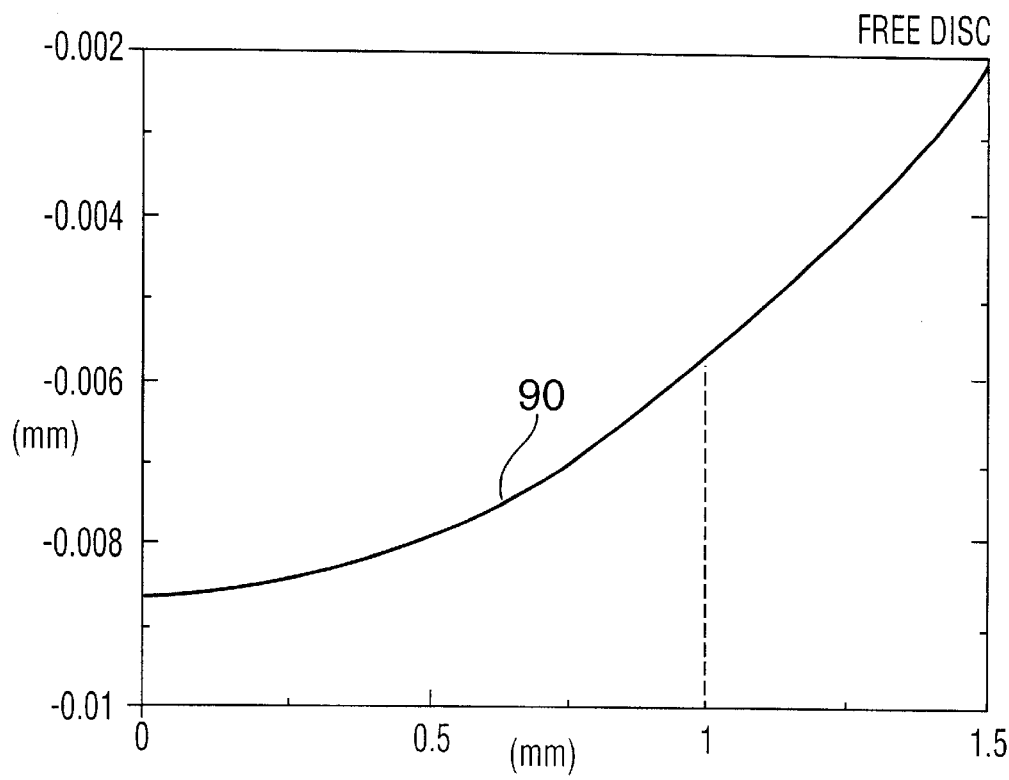
FIGS. 8A, 8B show graphical representations of OPD (optical path difference) for a free disc laser and a clamped disc laser, respectively.
Figure 8B:
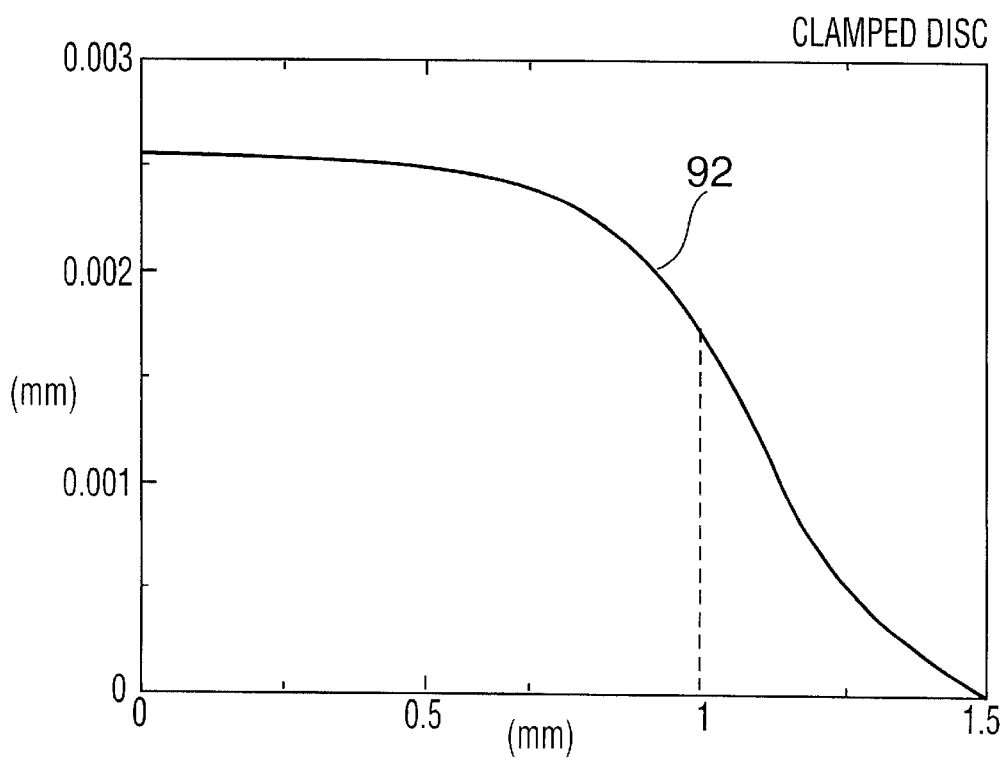

FIG. 8A is a graphical representation of the OPD (optical path difference) for a free disc measured in mm versus the radial position in the disc in mm. The relevant active region is between 0–1 mm. The lensing effect, represented by curve 90, due to the mechanical distortion of the disc 12 is significant and greatly inhibits the coherency and output power stability of the laser assembly. In contrast, FIG. 8B is a graphical representation of the OPD for a disc laser clamped according to the assembly 10 of FIG. 1. The lensing effect, represented by curve 92, is very constant in the active region (0–1 mm), which ensures consistent coherent laser output.

The principle of the invention involves the application of force to the laser disc 12 to inhibit mechanical deformation of the disc 12. The inventive system and method also improves thermal contact between the laser disc 12 and the heat sink 14 and provides lateral support to the disc 12 against bulging at areas where thermal fracture will most likely begin to occur.

The principle of mechanical clamping of the ends of a laser medium in order to reduce thermally-induced mechanical distortion of the medium can be extended to laser material shapes other than the flat disc or plate described above.

Figure 9A:
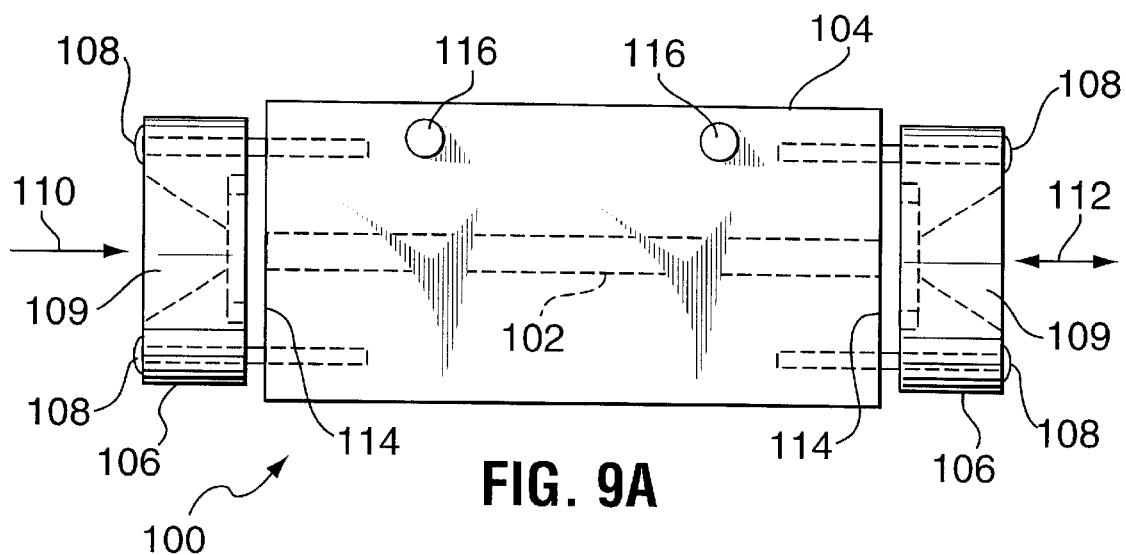
FIGS. 9A and 9B show an alternative clamping arrangement of the present invention for a laser rod geometry.
Figure 9B:
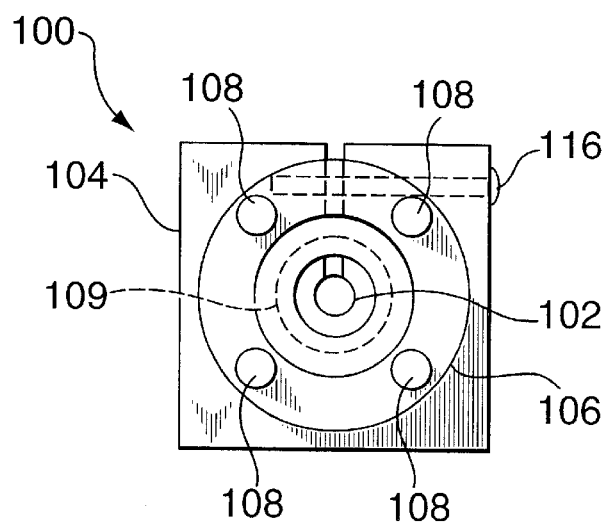

FIGS. 9A and 9B show a schematic illustration (side view in FIG. 9A and end view in FIG. 9B) of a mechanical clamping arrangement 100 for a rod-shaped laser material 102. The clamping arrangement 100 includes a heat sink/pressure body 104 that surrounds the rod 102. A pair of compression sleeves 106 are mounted at the ends of the rod 102 using longitudinal compression tightening screws 108. Each one of the compression sleeves 106 include a window 109 to permit pump light 110 access at one end and laser mode output 112 at another end. The compression sleeves 106 contact the heat sink/pressure body 104 at a compression window 114. A pair of radial compression tightening screws 116 are mounted through the heat sink/pressure body 104.

Figure 10:
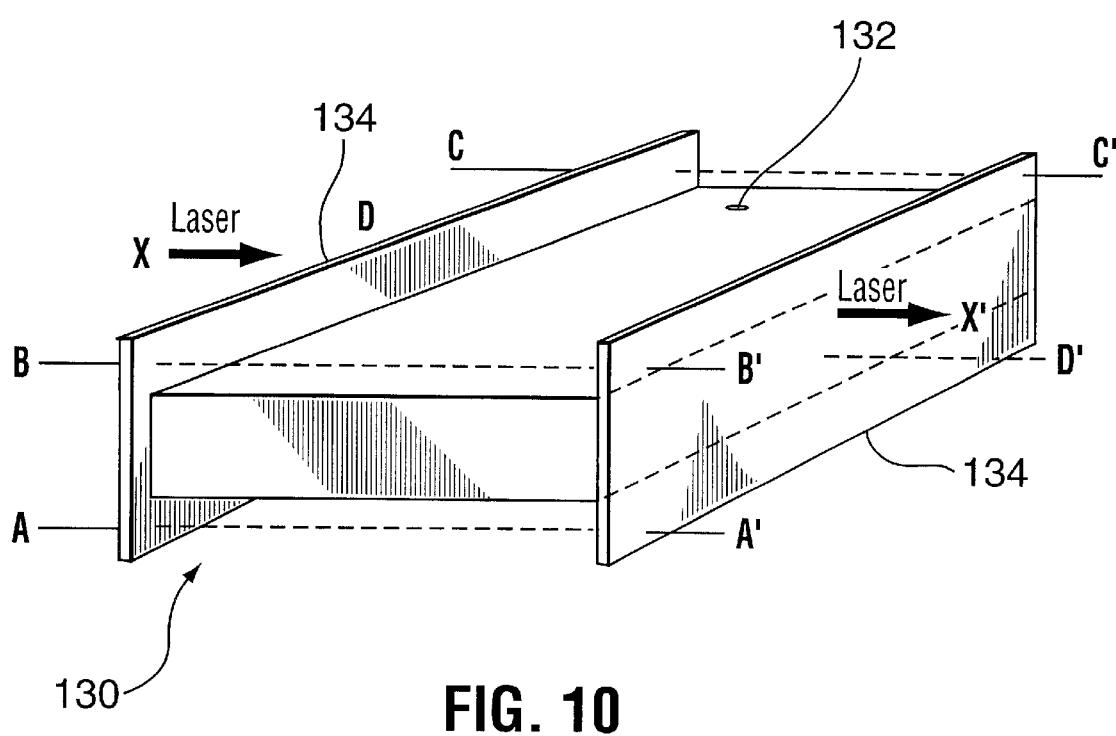
FIG. 10 shows an alternative clamping arrangement of the present invention for a laser slab geometry.

FIG. 10 shows a schematic illustration of a mechanical clamping arrangement 130 for a slab-shaped laser material 132. The arrangement 130 includes a pair of pressure/heat sink plates 134 mounted along two edges of the laser material 132 perpendicular to a lasing direction X–X'. The plates 134 are clamped at A–A', B–B', C–C' and D–D' using standard C-type clamps (not shown).

The clamping arrangements 100 and 130 provide similar benefits in relation to the reduction of temperature-induced mechanical deformation of the laser material 102 and 132 to reduce the distortion of the laser beam passing through the laser material 102, 132. The assemblies 100, 130 shown in FIGS. 9A, 9B and 10 are similar to that of FIG. 1 except instead of laser pumping through the end of the laser material (i.e. approximately parallel to the laser output beam) the assemblies pump from the side. Side pumped laser is commonly used for pumping a rod or slab geometries and is well known to those skilled in the art.

What is claimed is:

1. A laser clamping system for a laser medium in a solid state laser comprising:
   (a) a first member made from a heat conductive material;
   (b) a second member constructed to allow a laser beam to pass therethrough substantially unattenuated, the laser medium being disposed between and in contact with the first and second member; and
   (c) means for applying pressure to the laser medium through the first and second members to inhibit thermo-deformation of the laser medium.

2. The laser clamping system of claim 1, wherein the second member is made from a heat conductive material.

3. The laser clamping system of claim 1, wherein the second member is made from a material transparent to the laser beam.

4. The laser clamping system of claim 1, wherein the second member includes an aperture to allow the laser beam to pass through the second member to the laser medium.

5. The laser clamping system of claim 1, wherein at least one of the first and second members is a pressure body being harder than the laser medium.

6. The laser clamping system of claim 5, wherein the means for applying pressure includes a bolt assembly for attaching the first member to the second member.

7. The laser clamping system of claim 1, further comprising a conformable heat conductive material disposed intermediate the laser medium and at least one of the first and second members.

8. The laser clamping system of claim 1, further comprising at least one reflecting surface formed on at least one of the first and second members and configured to reflect pumping radiation transmitted through one of the first and second members and the laser medium to enhance pumping of the solid state laser.

9. The laser clamping system of claim 1, wherein the laser medium is a rod.

10. The laser clamping system of claim 1, wherein the laser medium is a slab.

11. The laser clamping system of claim 1, wherein the laser medium is a disc.

12. The laser clamping system of claim 11, wherein the means for applying pressure applies a pressure that exceed approximately 50 pounds per square inch.

13. The laser clamping system of claim 1, further comprising an index matching fluid disposed intermediate the laser medium and at least one of the first and second members.

14. The laser clamping system of claim 1, further comprising a cooling channel disposed in one of the members.

15. The laser clamping system of claim 1, wherein the heat conductive material is selected from the group consisting of: copper, brass, aluminum and nickel.

16. The laser clamping system of claim 1, wherein the heat conductive material is selected from the group consisting of: diamond and silicon carbide.

17. The laser clamping system of claim 16, wherein the heat conductive material is selected from the group consisting of: gold coated diamond, nickel-coated diamond, gold-coated silicon carbide and nickel-coated silicon carbide.

18. The laser clamping system of claim 3, wherein the material transparent to the laser beam is selected from the group consisting of: fused silica, sapphire and diamond.

19. The laser clamping system of claim 7, wherein the conformable heat conductive material is selected from the group consisting of: soft solder and indium.

20. The laser clamping system of claim 8, wherein the at least one reflecting surface includes a high reflectivity coating material at lasing and pumping wavelengths.

21. The laser clamping system of claim 1, wherein the laser medium includes a neodymium-doped material.

22. The laser clamping system of claim 1, wherein the laser medium includes a heat sink side and a pressure side, the heat sink side including a reflector layer, a metal layer and a contact layer; and the pressure side including an anti-reflective coating.

23. The laser clamping system of claim 22, wherein the pressure side includes a contact layer.

24. The laser clamping system of claim 23, wherein the contact layer is transparent at lasing and pumping wavelengths.

25. The laser clamping system of claim 22, wherein the reflector layer includes a high reflectivity coating material at lasing and pumping wavelengths.

26. The laser clamping system of claim 22, wherein the metal layer is selected from the group consisting of gold and copper.

27. The laser clamping system of claim 23, wherein the contact layer is selected from the group consisting of soft solder and indium.

28. The laser clamping system of claim 14, wherein a cooling medium is arranged to pass through the cooling channel.

29. The laser clamping system of claim 28, wherein the cooling medium is water.

30. The laser clamping system of claim 9, wherein the means for applying pressure includes a pressure body that surrounds the rod, a pair of compression sleeves mounted at ends of the rod for exerting pressure on the pressure body and the rod.

31. The laser clamping system of claim 30, wherein each of the compression sleeves includes an aperture arranged to permit pumping light access at one end of the rod and laser mode output at another end of the rod.

32. The laser clamping system of claim 10, wherein the means for applying pressure includes a pair of pressure plates mounted along two edges of the slab perpendicular to a lasing direction and clamps for applying pressure to the pressure plates and the slab.

33. A laser clamping system for a laser medium in a solid state laser comprising:
   (a) two heat conducting members, each heat conducting member having a generally planar surface, the two heat conducting members being oriented to receive the laser medium such that the laser medium contacts the generally planar surfaces of the two heat conducting members;
   (b) at least one of the heat conducting members allows the laser beam to pass therethrough substantially unattenuated and unchanged; and
   (c) pressure means for holding both heat conducting members in contact against the laser medium, whereby the heat conducting members and the pressure means remove heat from the laser medium under pumping conditions.

34. The laser clamping system of claim 33, wherein the heat conducting members induce a temperature gradient in the laser medium that is substantially parallel to the a propagation axis of a laser beam.

35. The laser clamping system of claim 34, wherein the at least one of the heat conducting members is made from a material transparent to the laser beam.

36. The laser clamping system of claim 34, wherein the at least one of the heat conducting members includes an aperture in communication with the laser medium for receiving the laser beam.

37. The laser clamping system of claim 33, wherein the pressure means includes a bolt assembly for attaching the two heat conducting members together.

38. The laser clamping system of claim 33, further comprising a conformable heat conductive material disposable intermediate the laser medium and at least one of the heat conducting members.

39. The laser clamping system of claim 33, further comprising at least one reflecting surface formed upon at least one of the heat conducting members and configured to reflect pumping radiation transmitted through at least one of the heat conducting members and the laser medium.

40. The laser clamping system of claim 33, wherein the laser medium is a rod.

41. The laser clamping system of claim 33, wherein the laser medium is a slab.

42. The laser clamping system of claim 33, wherein the laser medium is a disc.

43. A thin-plate laser comprising:
   (a) a solid state laser medium configured as a thin-plate;
   (b) two heat conductive members capturing the solid state laser medium therebetween, the two heat conductive members each generally conforming to one of a pair of opposed surfaces of the solid state laser medium to facilitate heat transfer from the solid state laser medium to the two heat conductive members;
   (c) at least one of the heat conductive members being optically transparent to transmit pumping light from a source to the solid state laser medium; and
   (d) force applying means for applying pressure to the heat conductive members to restrain the solid state laser medium from mechanical deformation under pumping conditions.

44. The laser clamping system of claim 43, wherein the heat conductive members are made of a material harder than the disc laser medium.

45. The laser clamping system of claim 43, wherein the generally planar surface of each heat conductive member includes a polished surface to enhance heat transfer at an interface thereof with the disc laser medium.

46. The laser clamping system of claim 43, further comprising a conformable, heat conductive material disposable intermediate the disc laser medium and at least one of the heat conductive members.

47. The laser clamping system of claim 46, wherein the heat conductive material is indium.

48. A method for enhancing an output of a laser having a solid state laser medium, the method comprising the steps of:
   (a) pumping the solid state laser medium through at least one of two heat conductive members, one heat conductive member being disposed in thermal contact with each of two generally opposed surfaces of the solid state laser medium;
   (b) removing heat from the solid state laser medium via the two heat conductive members; and (c) applying pressure to the heat conductive members to restrain the solid state laser medium from mechanically deforming under pumping conditions to mitigate thermal focusing and depolarization of laser radiation stimulated with the solid state laser medium.

49. The method of claim 48, further comprising the step of disposing a conformable, heat conductive material intermediate the solid state laser medium and at least one of the heat conductive members.

50. The method of claim 48, further comprising the step of reflecting pumping radiation from at least one mirrored surface formed upon at least one of the heat conductive members such that the reflected pumping radiation is transmitted back through the solid state laser medium to enhance pumping thereof.

51. A laser clamping system for a laser medium in a solid state laser comprising:

(a) members arranged to sandwich the laser medium therebetween; and (b) a device for applying pressure to the laser medium through the members to prevent thermally-induced mechanical distortion of the laser medium during operation.

52. The laser clamping system of claim 51, wherein the members include a first heat conductive body and a second body constructed to allow a laser beam to pass therethrough substantially unattenuated.

53. A thin-plate laser comprising:

(a) a solid state laser medium configured as a thin plate;

(b) two heat conductive members capturing the solid state laser medium therebetween, the two heat conductive members each generally conforming to one of a pair of opposed surfaces of the solid state laser medium to facilitate heat transfer from the solid state laser medium to the two heat conductive members;

(c) at least one of the heat conductive members being optically transparent to transmit pumping light from a source to the solid state laser medium; and (d) a device for applying pressure to the heat conductive members to restrain the solid state laser medium from mechanical deformation under pumping conditions.

54. A method for operating a laser comprising the steps of:

(a) sandwiching the laser medium between two layers; and (b) applying an anti-deformation force to the laser medium during operation, said anti-deformation force being sufficient to restrain thermally induced mechanical distortion in the laser medium.

55. The method of claim 54, further comprising the step selected at least one of the two layer to conduct heat away from the laser medium.

56. The method of claim 55, further comprising the step of disposing a conformable, heat conductive material intermediate the laser medium and at least one of the heat conductive members.

57. The method of claim 55, further comprising the step of reflecting pumping radiation from at least one mirrored surface formed upon at least one of the layers such that the reflected pumping radiation is transmitted back through the laser medium.

58. A solid state laser system comprising:

(a) a solid state laser medium that when irradiated or pumped produces lasing action and that is prone to thermally induced mechanical distortion under pumping conditions, said laser medium having two substantially opposing planar and parallel end surfaces which are substantially perpendicular to a propagation axis of a laser beam;

(b) two heat conducting members for conducting heat away from the laser medium, each heat conducting member having a generally planar surface placed in contact with one of the planar and parallel laser medium end surfaces;

(c) at least one of the heat conducting members allowing the laser beam to pass therethrough; and (d) a clamping device for applying sufficient clamping pressure to the laser material through the two heat conducting members to restrain the laser material from deforming as a result of thermally induced mechanical distortion under pumping conditions.

* * * * *